US011753218B2

(12) United States Patent
Chen et al.

(10) Patent No.: US 11,753,218 B2
(45) Date of Patent: Sep. 12, 2023

(54) ECO-FRIENDLY RECYCLABLE DROPPER AND BOTTLE

(71) Applicants:Chiu-Huo Chen, Miaoli County (TW); Chia-Hung Chien, Shanghai (CN)

(72) Inventors: Chiu-Huo Chen, Miaoli County (TW); Chia-Hung Chien, Shanghai (CN)

( * ) Notice: Subject to any disclaimer, the term of this patent is extended or adjusted under 35 U.S.C. 154(b) by 0 days.

(21) Appl. No.: 17/831,954

(22) Filed: Jun. 3, 2022

(65) Prior Publication Data

US 2023/0075210 A1   Mar. 9, 2023

(30) Foreign Application Priority Data

Sep. 3, 2021   (CN) .......................... 202111034521.5

(51) Int. Cl.
*B65D 47/18* (2006.01)
*B01L 3/02* (2006.01)
*B65D 65/38* (2006.01)

(52) U.S. Cl.
CPC ............ *B65D 47/18* (2013.01); *B01L 3/0272* (2013.01); *B65D 65/38* (2013.01); *B65D 2547/063* (2013.01); *B65D 2565/385* (2013.01)

(58) Field of Classification Search
USPC ......................................................... 222/420
See application file for complete search history.

(56) References Cited

U.S. PATENT DOCUMENTS 2,163,367 A * 6/1939 Barnes .................. B01L 3/0282
422/934
2,304,267 A * 12/1942 McCuiston ........... B01L 3/0282
422/934

(Continued)

FOREIGN PATENT DOCUMENTS

WO   WO-2013014384 A1 *   1/2013 ............ B01L 3/0265
WO   WO-2018142074 A1 *   8/2018 ............ B01L 3/0265

OTHER PUBLICATIONS

Dow, INFUSE 9507, Sep. 14, 2011, Technical Information (Year: 2011).*

*Primary Examiner* — Paul R Durand
*Assistant Examiner* — Michael J. Melaragno
(74) *Attorney, Agent, or Firm* — JCIP; Joseph G. Chu; Jeremy I. Maynard

(57) ABSTRACT

The present invention discloses an eco-friendly recyclable dropper, comprising a pressing portion and a pipette, wherein a bottom of the pressing portion is wrapped around a top of the pipette, wherein a bottom inner wall of the pressing portion includes a concave groove, wherein a top outer wall of the pipette includes a corresponding convex circle, wherein the concave groove matches with the convex circle and become airtight based on the characteristics of both material, wherein the pressing portion is made of PE material, wherein the pipette is made of PP material. Since the pressing head is made of PE material or a mixture material of PE and PP, and the pipette is made of PP material, a combination of the pressing head and the pipette is better in airtightness comparing to prior arts using glass pipettes; furthermore, the design of the pressing head and the concave groove and the convex circle of the pipette provides better airtightness; the dropper and the bottle of this invention both used PP and PE material, which can be fully recycled and reused after using the liquid within, avoids environmental pollution and saves resources. The market of this invention is very wide and this invention has a breakthrough meaning in the dropper field.

10 Claims, 6 Drawing Sheets

(56) References Cited

U.S. PATENT DOCUMENTS

| | | | | |
|---|---|---|---|---|
| 2,321,369 A * | 6/1943 | Dubilier | B01L 3/0272 | |
| | | | 422/930 | |
| 2,720,343 A * | 10/1955 | Ross | F16N 3/06 | |
| | | | 222/179.5 | |
| 2,845,963 A * | 8/1958 | Zackheim | B65D 23/00 | |
| | | | 422/934 | |
| 2,947,071 A * | 8/1960 | Marchant | B23P 11/00 | |
| | | | 29/451 | |
| 3,233,785 A * | 2/1966 | Burke | B01L 3/021 | |
| | | | 422/922 | |
| 3,558,022 A * | 1/1971 | Zytko | B65D 55/04 | |
| | | | 401/122 | |
| 4,416,400 A * | 11/1983 | Dougherty, Sr. | B01L 3/0282 | |
| | | | 422/934 | |
| 5,226,572 A * | 7/1993 | Gargione | G01F 11/084 | |
| | | | 422/922 | |
| 5,505,712 A * | 4/1996 | McMillian | A61M 35/003 | |
| | | | 604/289 | |
| H2044 H * | 9/2002 | Faughey | B01L 3/0282 | |
| | | | 141/22 | |
| 11,148,131 B1 * | 10/2021 | Bulla | B01L 3/021 | |
| 2001/0035432 A1 * | 11/2001 | Buehler | B01L 3/0282 | |
| | | | 222/206 | |
| 2003/0098321 A1 * | 5/2003 | Kaposi | G01F 11/084 | |
| | | | 222/420 | |
| 2006/0118582 A1 * | 6/2006 | Hsu-Yeh | B01L 3/0272 | |
| | | | 222/633 | |
| 2006/0273061 A1 * | 12/2006 | Fricke | B65D 51/24 | |
| | | | 215/332 | |
| 2011/0108160 A1 * | 5/2011 | Lee | A45D 34/04 | |
| | | | 141/24 | |
| 2011/0146419 A1 * | 6/2011 | Gonzalez | A61B 10/0045 | |
| | | | 73/864.11 | |
| 2020/0094244 A1 * | 3/2020 | Ganter | B65D 47/18 | |
| 2020/0407130 A1 * | 12/2020 | Enterline | B65D 47/18 | |
| 2022/0331791 A1 * | 10/2022 | Bulla | B01L 3/0217 | |

\* cited by examiner

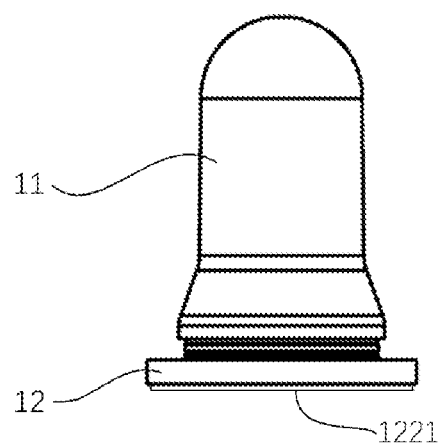
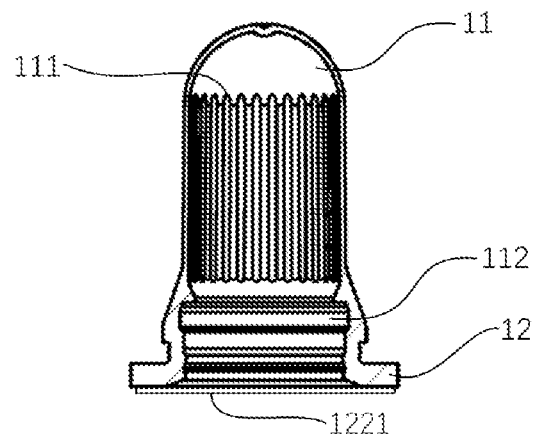
FIG. 3A   FIG. 3B
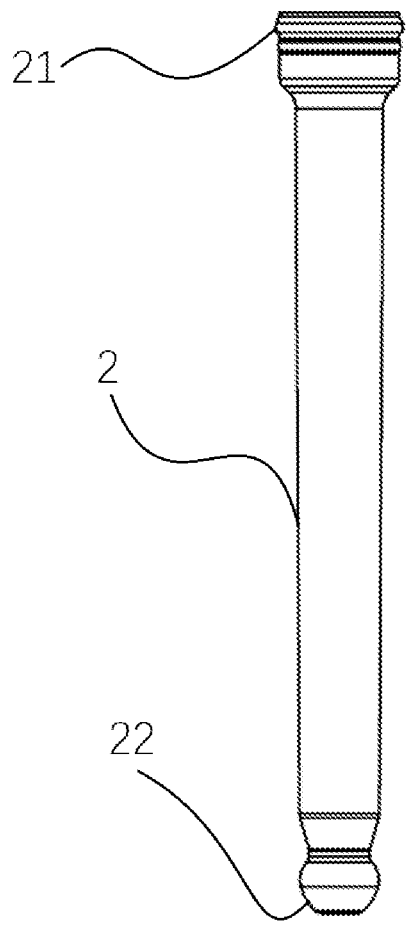
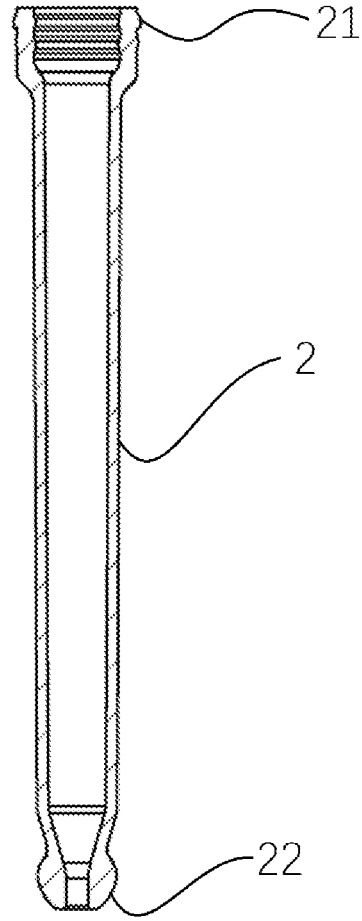
FIG. 4A   FIG. 4B

ECO-FRIENDLY RECYCLABLE DROPPER AND BOTTLE

CROSS REFERENCE TO RELATED APPLICATION

The present application claims the benefit of China Patent Application No. 202111034521.5 filed on Sep. 3, 2021, which is hereby incorporated by reference in its entirety

FIELD OF INVENTION

The present invention relates to a dropper tool. More specifically, the present invention is a recyclable dropper and bottle with enhanced suction and airtightness.

BACKGROUND

A bottle for storing items, comprising a bottle and a cap. The bottle and the cap are generally in a detachable connection. In general, normal caps are used to cover bottleneck, the bottle and the caps are connected with threads in between, for example, with outer threads set up by the bottleneck and its corresponding inner threads set up within the cap. The cap can be easily opened using the above-mentioned method that connects the bottleneck and the cap via threads. However, the amount of liquid being poured out cannot be controlled when removing the stored liquid from the bottle, thereby causing a waste of the liquid. In order to precisely control the amount being poured out, some caps are connected to a dropper. Droppers nowadays in business consist of two parts, one being a dropper teat and the other being a glass pipette. Squeeze the dropper teat to allow the liquid in the bottle to attach inside the glass pipette, then squeeze the dropper teat again to excrete the liquid within the glass pipette.

Since the dropper teat is mostly made of NBR material and has good elasticity, the dropper teat can wrap around the glass pipette and provides well airtightness with the glass pipette. NBR (Nitrile-Butadiene Rubber) is a synthetic rubber derived from acrylonitrile and butadiene via emulsion polymerization. There will certainly be acrylonitrile residues after use. Acrylonitrile is a highly toxic chemical substance, after long term contact with human body, some will inevitably be absorbed inside human body and cause acute intoxication or chronic intoxication. Severe cases will lead to cancer. Therefore, droppers in business nowadays exist great potential risk to human health after the cosmetic content made contact with NBR dropper teat and being wiped on skin by consumers in the long term. Meanwhile, droppers nowadays have worse airtightness, and the dropper teat is connected to the glass pipette merely through its own elasticity. Therefore, during the squeezing process, gas leakage between the dropper teat and the glass pipette tends to exist due to deformation of the dropper teat, thereby causing liquid unable to be sucked in the glass pipette or difficulties in excreting the liquid. Moreover, there may be issues that causes liquid to leak within the dropper or volatilize.

In modern society, with the expansion of human population and technology development, the whole world is rapidly transitioning and revolutionizing. Energy consumption and waste on the planet, severe environment pollution leads to fierce conflicts over limited resources. If the liquid within the dropper is discarded randomly after use, the chemical substance will certainly contaminate the environment. If people can recycle and reuse, it will be better whether for saving resources or environmental protection. However, droppers in the art use glass pipettes and are inconvenient to recycle. Therefore, in need of revolutionary upgrade for droppers in order to solve the above-mentioned issue.

BRIEF DESCRIPTION

This invention provides an eco-friendly recyclable dropper and bottle, with the purpose of providing an enhanced suction and well airtight eco-friendly dropper. The dropper and the bottle can be recycled as a whole and reused after use. This invention also provides a bottle.

The present invention is fulfilled by the following embodiments.

An eco-friendly recyclable dropper, comprising a pressing portion and a pipette, wherein a bottom of the pressing portion is wrapped around a top of the pipette, wherein a bottom inner wall of the pressing portion includes a concave groove, wherein a top outer wall of the pipette includes a corresponding convex circle, wherein the concave groove matches with the convex circle and become airtight based on the characteristics of both material, wherein the pressing portion is made of PE material or a mixture material of PE and PP, wherein the pipette is made of PP material.

As a preferred embodiment, the pressing portion comprises a pressing head and a base, the pressing head and the base are formed in one piece with the shape alike a screw lid with a rim.

As a preferred embodiment, the pressing head is a round cap structure, the top of the round cap structure is smooth, the bottom of the round cap structure has an opening, the pressing head will deform under external force, and will reform under self-elasticity, an inner wall of the pressing head is evenly distributed with reinforcing strips to increase the reforming ability of the pressing head, the pressing head is made of PE material or a mixture material of PE and PP, the wall thickness of the pressing head is 0.3 mm to 0.5 mm in order to maximize the elasticity of the pressing head without affecting the feel of the pressing head.

As a preferred embodiment, the base is a cylinder structure, the bottom of the cylinder structure includes an eversion circle, the top of the cylinder structure and the bottom of the pressing head is connected together in one piece, the base is made of PP material which is rigid, hard, uneasy to deform and provides fixation for the pressing head.

As a preferred embodiment, the inner wall of the bottom of the pressing head comprises a circle of concave groove, the top and the bottom of the concave groove are set up respectively with an upper shaft shoulder and a lower shaft shoulder, the upper shaft shoulder of the concave groove is designed to be a flat structure, a corner is formed by the upper shaft shoulder and the wall of the pressing head, the corner creates a limit effect for the pipette, the lower shaft shoulder of the concave groove is designed to be a slope structure to allow the pipette to be easily placed inside and prevent the pipette from falling out.

As a preferred embodiment, the cylinder structure of the base and the eversion circle of the base connects and forms a ring of chamfer, which allows the pipette to be easily placed inside, a lower wall of the eversion circle of the base is set up with a ring of limit strip.

As a preferred embodiment, the pipette is made of PP material, the diameter of the upper part of the pipette is bigger than the diameter of the lower part, the upper part of the pipette comprises a convex circle that is compatible with the concave groove on the inner wall of the pressing portion, the bottom of the pipette has a sphere shaped nozzle, wherein the sphere shaped nozzle allows consumers to drip, the pipette is made of PP material.

As a preferred embodiment, a set of the dropper comprises a collar, the collar is alike a bottle cap with an opening at the top, the collar is secured on the upper wall of the eversion circle of the base via the opening, the collar is tightly pressed against the upper wall of the eversion circle of the base, in order to avoid the eversion circle along with the base from deforming when the pressing portion is deformed, and avoid gas leak in between the pressing portion and the pipette, an inner wall of the collar has inner threads, the collar is made of PP material.

The present invention has another purpose of providing an eco-friendly recyclable bottle, which comprises the above-mentioned eco-friendly recyclable dropper.

As a preferred embodiment, the bottle comprises a convex limit strip around the edge of the bottleneck tip of the bottle, the convex limit strip is slightly larger than the limit strip underneath the eversion circle of the base, the convex limit strip restricts the limit strip and provides airtight feature for the bottle, a lower part of the bottleneck of the bottle is placed with a funnel structure, the funnel structure comprises several stents, the stents that are adjacent with each other have hollow in between, the upper part of the stents and the bottle are formed in one piece, the lower part of all of the stents is connected into a circle, the diameter of the circle is slightly bigger than the pipette, which allows the pipette to be easily move in a see-saw motion within the bottle, the circle can scrape off thoroughly all the liquid on the outer wall of the pipette, the liquid that were scraped off will flow into the bottle through the hollow, the outer wall of the bottleneck of the bottle is designed with outer threads, which match with the inner threads of the collar, the bottle and the stents are made of PP material.

Advantages and features of the present invention.

(1). The inner wall of the pressing head is set up with reinforcing strips, which increases the reforming ability, the wall thickness of the pressing head is moderate, when using the pressing head, it can rapidly reform and suck the liquid from the bottle into the pipette; the pressing head also allows the consumer to easily and conveniently use during dripping process, provides more flexibility during operation and better touch.

(2). The corner design of the upper shaft shoulder on the concave groove within the pressing head has a limiting effect on the convex circle of the pipette; the slope structure design of the lower shaft shoulder allows the pipette to be easily placed inside the pressing head; the chamfer design at the eversion circle of the base lessen the resistance when the pipette passes through and allows the pipette to be easily placed inside.

(3). The funnel structure, stents and hollow design within the bottle allow the pipette to move up and down inside the bottle to obtain liquids, easily scrape off the residue liquid on the outer wall of the pipette, prevents the liquid from leaking out of the bottle, avoids environmental pollution and saves resources.

(4). Since the pressing head is made of PE and PP material, the pipette is made of rigid plastic, the combination of both pieces provides better airtight quality comparing to glass pipettes of prior arts; additionally, the design of the concave groove and the convex circle of the pipette and the pressing head provides even better airtight quality; the collar is designed to tightly pressed against the conversion circle of the base of the pressing portion to avoid the base from deforming and gas leakage due to deformation of the pressing head; meanwhile, the inner threads design of the collar match tightly with the outer threads design of the bottleneck of the bottle to avoid any leakage or deterioration of the liquid inside the bottle.

(5). The dropper and the bottle in this invention are made of PP and PE material, which can be fully recycled and reused. This invention saves resources, has great potential in future market and a breakthrough meaning in dropper field.

BRIEF DESCRIPTION OF THE DRAWINGS

The following descriptions should not be considered limiting in any way. With reference to the accompanying drawings, like elements are numbered alike:

FIGS. 3A and 3B are schematic illustrations of the structure of a pressing portion in this invention, FIG. 3A is a schematic illustration of the overall structure of a pressing portion, FIG. 3B is a schematic illustration of the cross-sectional structure of a pressing portion;

FIGS. 4A and 4B are schematic illustrations of the structure of a pipette in this invention, FIG. 4A is a schematic illustration of the overall structure of a pipette, FIG. 4B is a schematic illustration of the cross-sectional structure of a pipette;

FIG. 5A is a schematic illustration of the overall structure of a collar, FIG. 5B is a schematic illustration of the cross-sectional structure of a collar;

FIG. 6A is a schematic illustration of the overall structure of a bottle, FIG. 6B is a schematic illustration of the cross-sectional structure of a bottle;

DETAILED DESCRIPTION

The following is a detailed description of the embodiments accompanied with the drawings. The embodiments are presented for the purpose of illustrating the exemplary aspects disclosed herein, provides detailed examples substantial operating process. The scope of this invention is not to be limited in the following embodiments.

Figure 1:
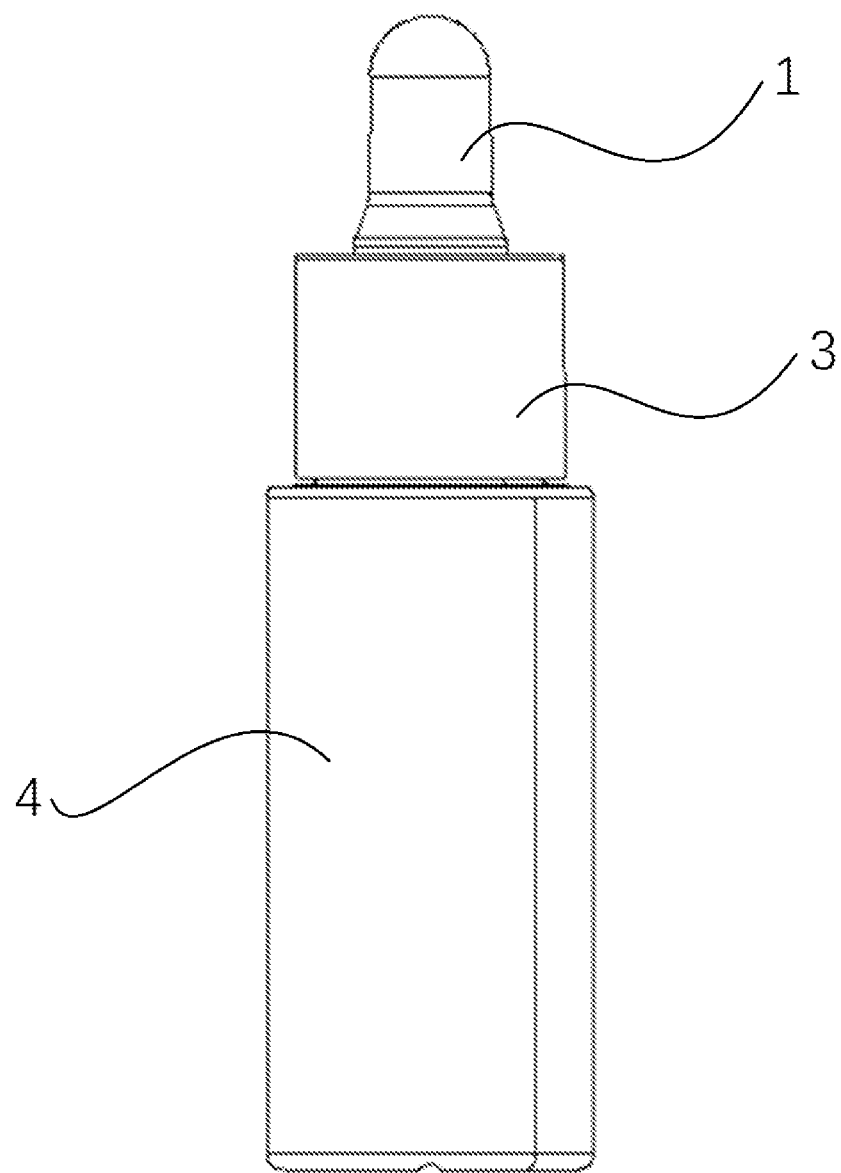
FIG. 1 is a schematic illustration of an overall structure of the dropper and the bottle of this invention connected together.
Figure 2:
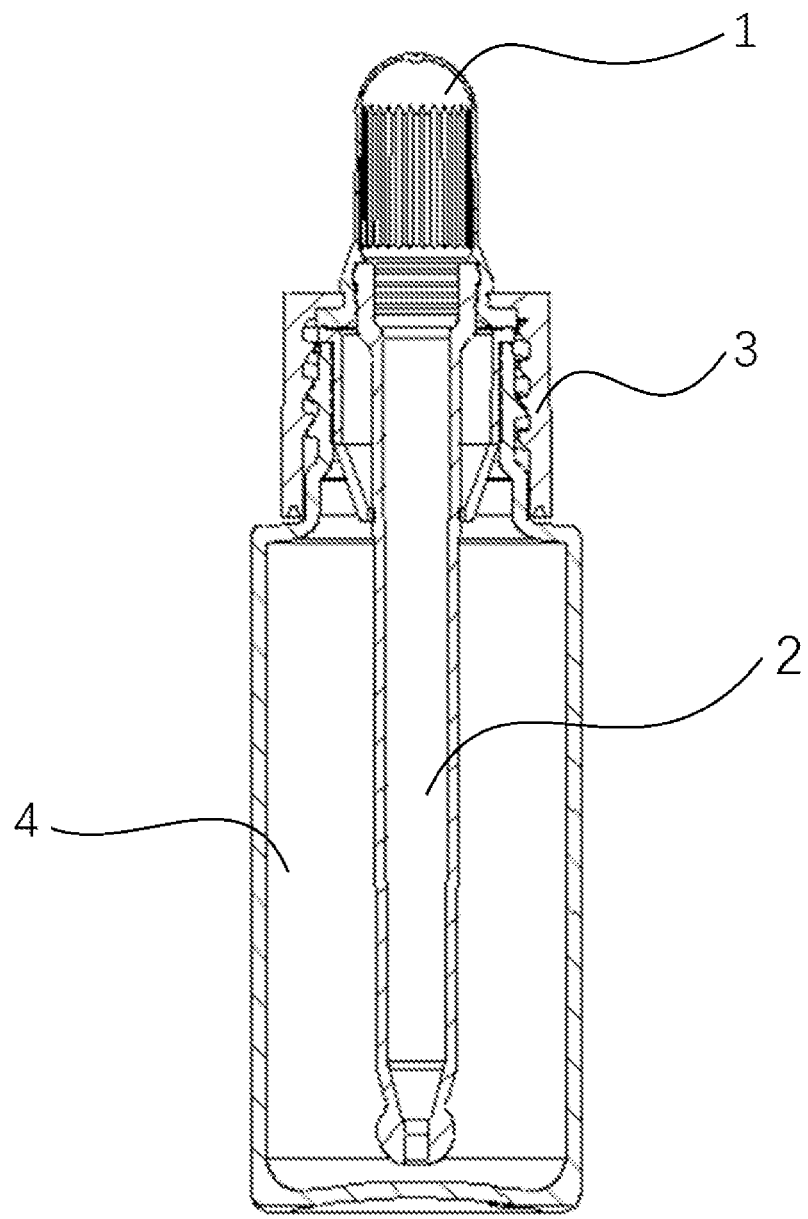
FIG. 2 is a schematic illustration of a cross sectional structure of the dropper and the dropper of this invention connected together.

As shown in FIG. 1 and FIG. 2, the eco-friendly dropper comprises a pressing portion, a pipette 2, the bottom of the pressing portion is wrapped around a top of the pipette 2, a bottom inner wall of the pressing portion includes a concave groove, a top outer wall of the pipette 2 includes a corresponding convex circle, the concave groove matches with the convex circle and become airtight based on the characteristics of both materials. A set includes a bottle 4, using a collar 3 to attach the pressing portion and the pipette 2 to the opening of bottle 4.

Figure 7:
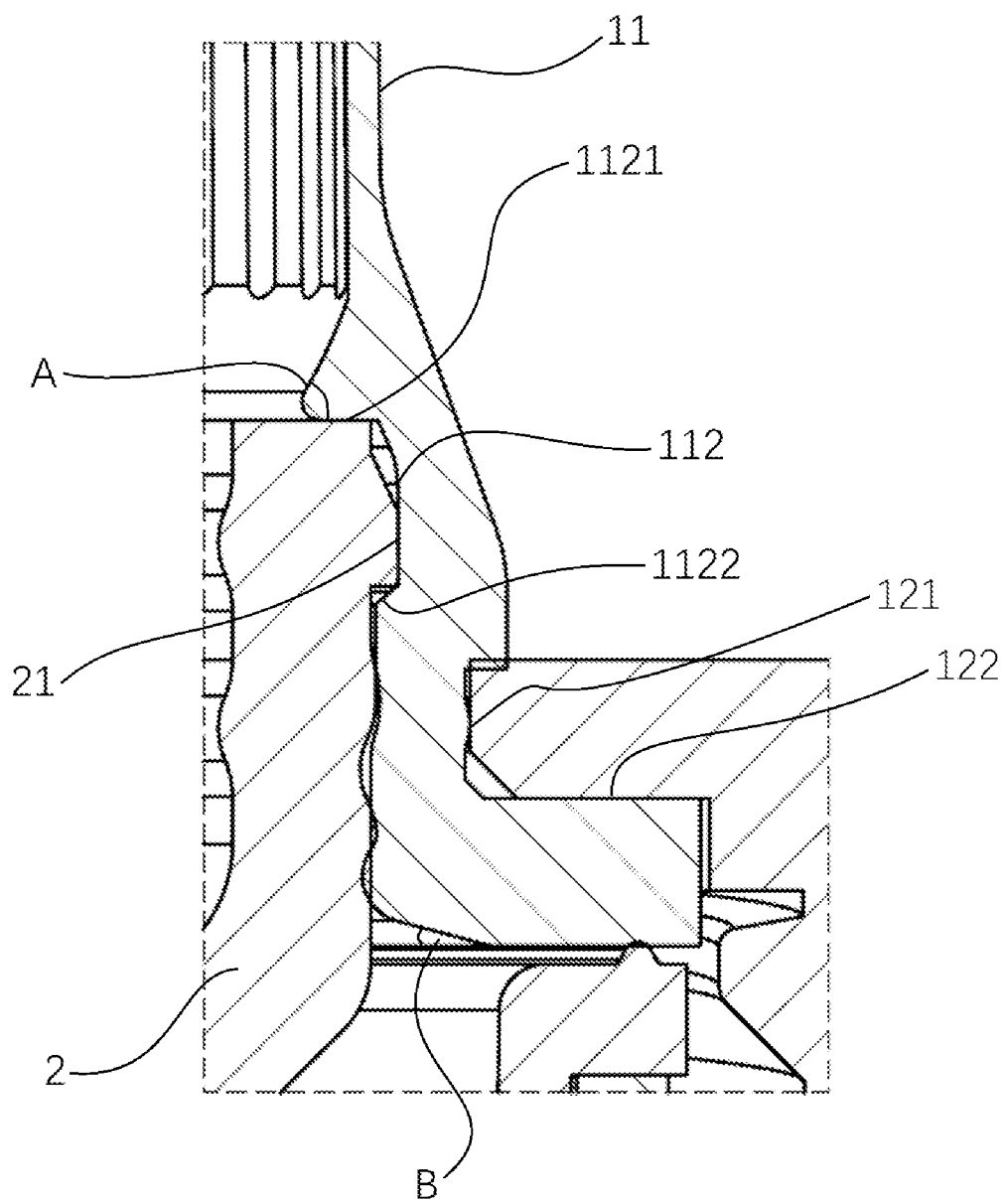
FIG. 7 is an enlarged schematic illustration of the structure where the pressing portion, the pipette and the collar are partially connected in this invention.

As shown in FIGS. 3A, 3B, and 7, the pressing portion comprises a pressing head 11 and a base 12, the pressing head and the base are formed in one piece with the shape alike a screw lid with a rim. The pressing head 11 is a round cap structure, the top of the round cap structure is smooth, the bottom of the round cap structure has an opening, the pressing head 11 will deform under external force, and will reform under self-elasticity, an inner wall of the pressing head 11 is evenly distributed with reinforcing strips 111 in order to increase the ability for the pressing head 11 to reform. If the wall thickness is too thick, it will not only lessen the elasticity but also affect the feel when the consumer is using. If the wall thickness is too thin then it is not durable. Therefore, in order to maximize the elasticity of the pressing head 11 without affecting the feel of the pressing head 11, the wall thickness of the pressing head 11 is set to be 0.3 mm.

The base 12 is a cylinder structure, the bottom of the cylinder structure 121 includes an eversion circle 122, the top of the cylinder structure 121 and the bottom of the pressing head 11 is connected together in one piece, the base 12 is made of PP material which is rigid, hard, uneasy to deform and provides fixation for the pressing head. The pressing head 11 and the base 12 are made of PE material or a mixture material of PE and PP.

An inner wall of the bottom of the pressing head 11 comprises a circle of concave groove 112, the top and the bottom of the concave groove 112 are set up respectively with an upper shaft shoulder 1121 and a lower shaft shoulder 1122, the upper shaft shoulder 1121 of the concave groove 112 is designed to be a flat structure, a corner (A) is formed by the upper shaft shoulder 1121 and the wall of the pressing head 11, the corner creates a limit effect for the pipette 2, the lower shaft shoulder 1122 of the concave groove 112 is designed to be a slope structure to allow the pipette 2 to be easily placed inside and prevent the pipette 2 from falling out.

The cylinder structure 121 of the base 12 and the eversion circle 122 of the base 12 connect and form a ring of chamfer (B), which allows the pipette 2 to be easily placed inside, a lower wall of the eversion circle 122 of the base 12 is set up with a ring of limit strip 1221.

As shown in FIGS. 4A, 4B and 7, the pipette 2 is made of PP material, the diameter of the upper part of the pipette 2 is bigger than the diameter of the lower part, the upper part of the pipette 2 comprises a convex circle 21 that is compatible with the concave groove on the inner wall of the pressing portion, the bottom of the pipette 2 has a sphere shaped nozzle 22, wherein the sphere shaped nozzle 22 allows consumers to drip, the pipette 2 is made of PP material.

Figure 5A:
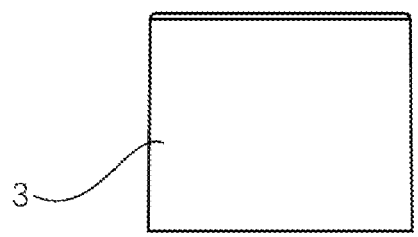
FIGS. 5A and 5B are schematic illustrations of the structure of a collar in this invention.
Figure 5B:
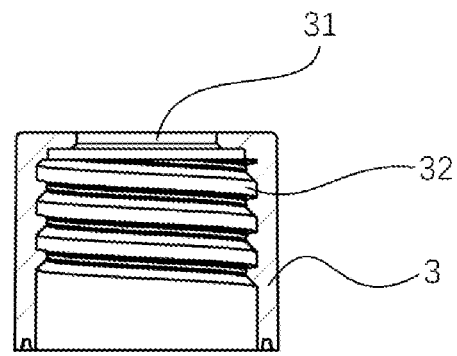

As shown in FIGS. 5A and 5B, a set of the dropper comprises a collar 3, the collar 3 is alike a bottle cap with an opening 31 at the top, the collar 3 is secured on the upper wall of the eversion circle 122 of the base 12 via the opening 31, the collar 3 is tightly pressed against the upper wall of the eversion circle 122 of the base 12, in order to avoid the eversion circle 122 along with the base 12 from deforming when the pressing portion is deformed, and avoid gas leak in between the pressing portion and the pipette 2, an inner wall of the collar 3 has inner threads 32, the collar 3 is made of PP material.

Figure 6A:
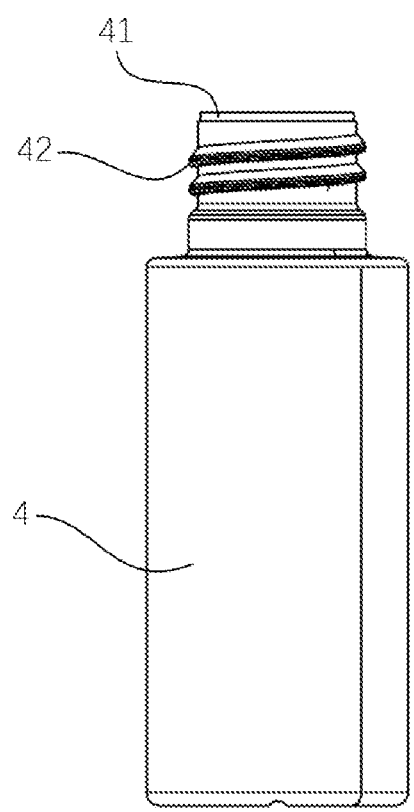
FIGS. 6A and 6B are schematic illustrations of the structure of a bottle in this invention.
Figure 6B:
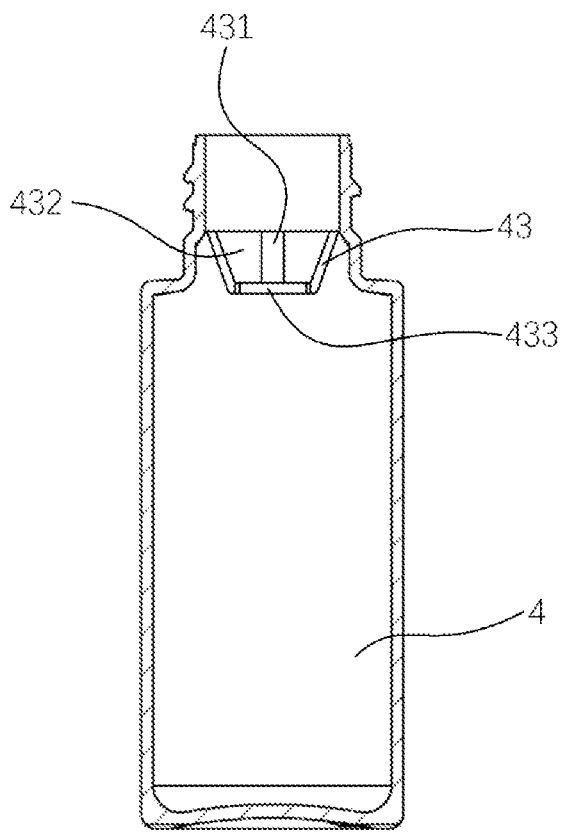
Figure 8:
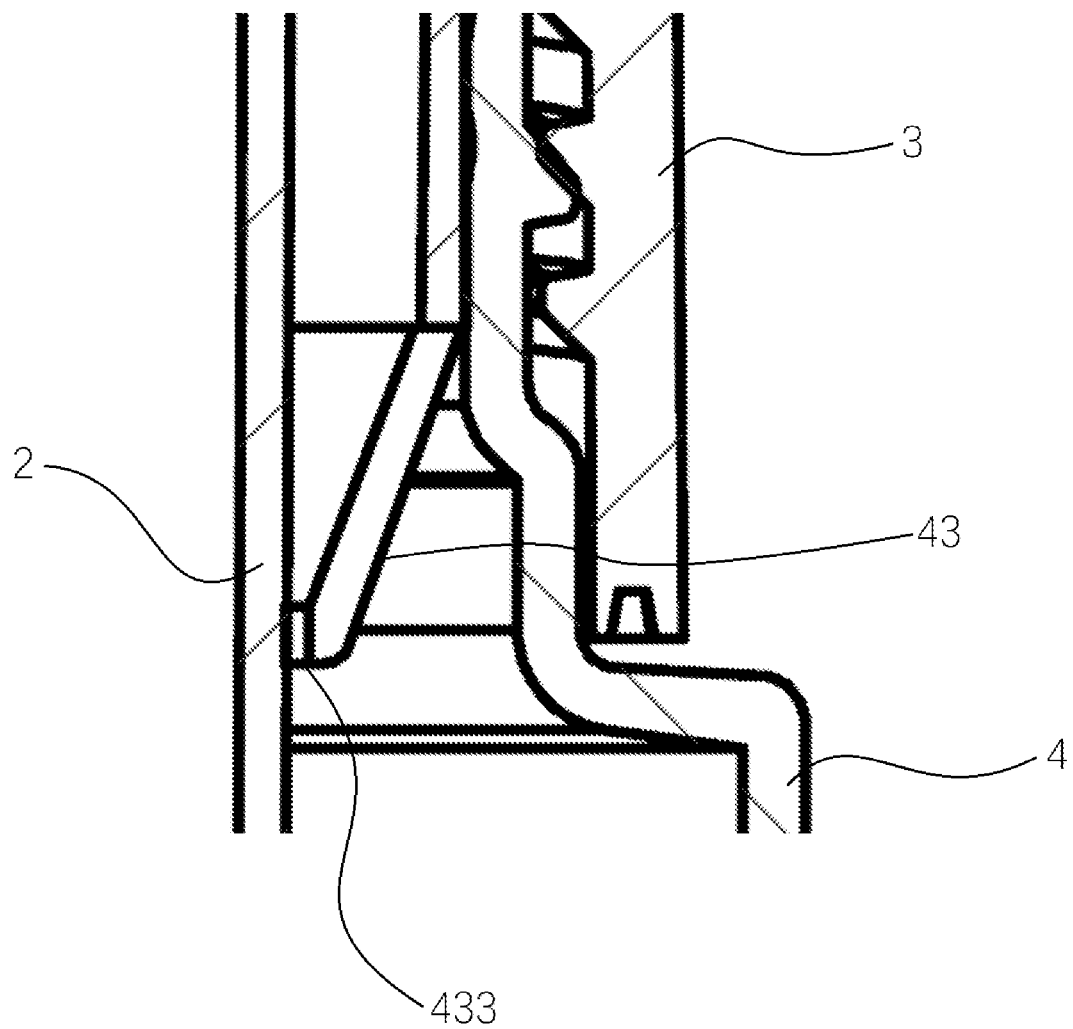
FIG. 8 is an enlarged schematic illustration of the structure where the bottle, the pipette and the collar are partially connected in this invention.

As shown in FIGS. 6A, 6B and 8, the bottle 4 comprises a convex limit strip 41 around the edge of the bottleneck tip of the bottle 4, the convex limit strip 41 is slightly larger than the limit strip 1221 underneath the eversion circle 122 of the base 12, the convex limit strip 41 restricts the limit strip 1221 and provides airtight feature for the bottle 4, a lower part of the bottleneck of the bottle 4 is placed with a funnel structure 43, the funnel structure 43 comprises several stents 431, the stents 431 that are adjacent with each other have hollow 432 in between, the upper part of the stents 431 and the bottle 4 are formed in one piece, the lower part of all of the stents 431 is connected into a circle 433, the diameter of the circle 433 is slightly bigger than the pipette 2, which allows the pipette 2 to easily move in a see-saw motion within the bottle 4, the circle 433 can scrape off thoroughly all the liquid on the outer wall of the pipette 2, the liquid that were scraped off will flow into the bottle 4 through the hollow 432, the outer wall of the bottleneck of the bottle 4 is designed with outer threads 42, which match with the inner threads 32 of the collar 3, the bottle 4 and the stents 431 are made of PP material.

When the consumer squeezes the pressing head, a negative pressure forms during the reforming process, which causes liquid to flow into the pipette from the bottle. When the consumer takes out the pipette from the bottle while still squeezing the pressing head, the liquid on the outer wall of the pipette will be scraped off thoroughly on the circle of the funnel structure when the pipette passes the funnel structure. The liquid that was scraped off will flow into the bottom of the bottle through the hollow of the stents. The consumer can once again squeeze the pressing head and wipe the liquid on a desired part of the body.

A mesopore structure of the stent allows content to be sucked in and excreted by pressing again, which is convenient for consumer to use. This invention fully uses PP/PE material and is more environmental friendly.

Exemplary embodiments are described herein to illustrate the basic concept and features and advantages of the present invention. It will be understood by those skilled in the art that the invention is not be limited to the particular embodiment or embodiments disclosed herein. Various changes may be made and equivalents may be substituted without departing from the scope of the claims. Many modifications may be made to adapt a particular situation to the teachings of the invention without departing from the essential scope thereof. The scope of this invention is defined by the claims and its equivalents.

BRIEF DESCRIPTION OF REFERENCE NUMERALS

1: pressing portion
11: pressing head
111: reinforcing strips
112: concave groove
1121: upper shaft shoulder
1122: lower shaft shoulder
12: base
121: cylinder structure
122: eversion circle
1221: limit strip
2: pipette
21: convex circle
22: sphere shaped nozzle
3: collar
31: opening
32: inner thread
4: bottle
41: convex limit strip
42: outer thread
43: funnel structure
431: stent 432: hollow
433: circle
A: corner
B: chamfer

What is claimed is:

1. An eco-friendly recyclable dropper, comprising a pressing portion and a pipette, wherein a bottom of the pressing portion is wrapped around a top of the pipette, wherein the pressing portion comprises a pressing head, the pressing head will deform under external force, and will reform under self-elasticity, an inner wall of the pressing head is evenly distributed with reinforcing strips, wherein a bottom inner wall of the pressing portion includes a concave groove, wherein a top outer wall of the pipette includes a corresponding convex circle, wherein the concave groove matches with the convex circle and become airtight based on the characteristics of both material, wherein the pressing portion is made of PE material or a mixture material of PE and PP, wherein the pipette is made of PP material.

2. The eco-friendly recyclable dropper of claim 1, wherein the pressing portion further comprises a base, the pressing head and the base are formed in one piece with the shape of a screw lid with a rim.

3. The eco-friendly recyclable dropper of claim 1, wherein the pressing head is a round cap structure, the top of the round cap structure is smooth, the bottom of the round cap structure has an opening, the pressing head is made of PE material or a mixture material of PE and PP, a wall thickness of the pressing head is 0.3 mm to 0.5 mm in order to maximize the elasticity of the pressing head.

4. The eco-friendly recyclable dropper of claim 1, wherein the base is a cylinder structure, the bottom of the cylinder structure includes an eversion circle, the top of the cylinder structure and the bottom of the pressing head is connected together in one piece, the base is made of PP material which is rigid, hard, uneasy to deform and provides fixation for the pressing head.

5. The eco-friendly recyclable dropper of claim 1, wherein the inner wall of the bottom of the pressing head comprises a circle of concave groove, the top and the bottom of the concave groove are set up respectively with an upper shaft shoulder and a lower shaft shoulder, the upper shaft shoulder of the concave groove is designed to be a flat structure, a corner is formed between the upper shaft shoulder and the wall of the pressing head, the corner creates a limit effect for the pipette, the lower shaft shoulder of the concave groove is designed to be a slope structure to allow the pipette to be easily placed inside and prevent the pipette from falling out.

6. The eco-friendly recyclable dropper of claim 4, wherein the cylinder structure of the base and the eversion circle of the base connect and form a ring of chamfer, which allows the pipette to be easily placed inside, a lower wall of the eversion circle of the base is set up with a ring of limit strip.

7. The eco-friendly recyclable dropper of claim 1, wherein the pipette is made of PP material, the diameter of the upper part of the pipette is bigger than the diameter of the lower part, the upper part of the pipette comprises a convex circle that is compatible with the concave groove on the inner wall of the pressing portion, the bottom of the pipette has a sphere shaped nozzle, wherein the sphere shaped nozzle allows consumers to drip, the pipette is made of PP material.

8. The eco-friendly recyclable dropper of claim 4, wherein a set of the dropper comprises a collar, the collar has the shape of a bottle cap with an opening at the top, the collar is secured on the upper wall of the eversion circle of the base via the opening, the collar is tightly pressed against the upper wall of the eversion circle of the base, in order to avoid the eversion circle along with the base from deforming when the pressing portion is deformed, and avoid gas leak in between the pressing portion and the pipette, an inner wall of the collar has inner threads, the collar is made of PP material.

9. An eco-friendly recyclable bottle, comprising the eco-friendly recyclable dropper of claim 1.

10. The eco-friendly recyclable bottle of claim 9, wherein the bottle comprises a convex limit strip around the edge of the bottleneck tip of the bottle, the convex limit strip is slightly larger than the limit strip underneath the eversion circle of the base, the convex limit strip restricts the limit strip and provides airtight feature for the bottle, a lower part of the bottleneck of the bottle is placed with a funnel structure, the funnel structure comprises several stents, the stents that are adjacent with each other have hollow in between, the upper part of the stents and the bottle are formed in one piece, the lower part of all of the stents is connected into a circle, the diameter of the circle is slightly bigger than the pipette, which allows the pipette to move in a see-saw motion within the bottle, the circle can scrape off thoroughly all the liquid on the outer wall of the pipette, the liquid that were scraped off will flow into the bottle through the hollow, the outer wall of the bottleneck of the bottle is designed with outer threads, which match with the inner threads of the collar, the bottle and the stents are made of PP material.

* * * * *